April 27, 1937.  F. W. MERRICK  2,078,336
MACHINE FOR CUTTING SHEET MATERIAL
Filed Oct. 19, 1933    4 Sheets-Sheet 1
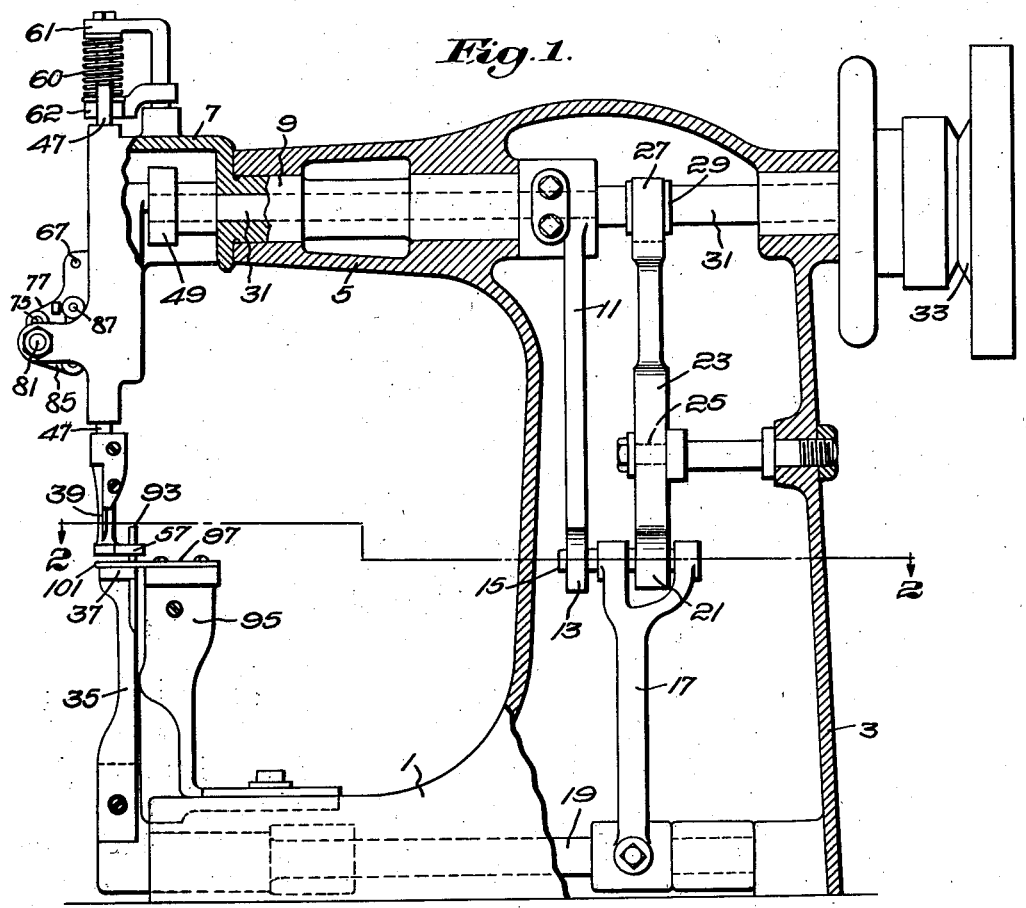
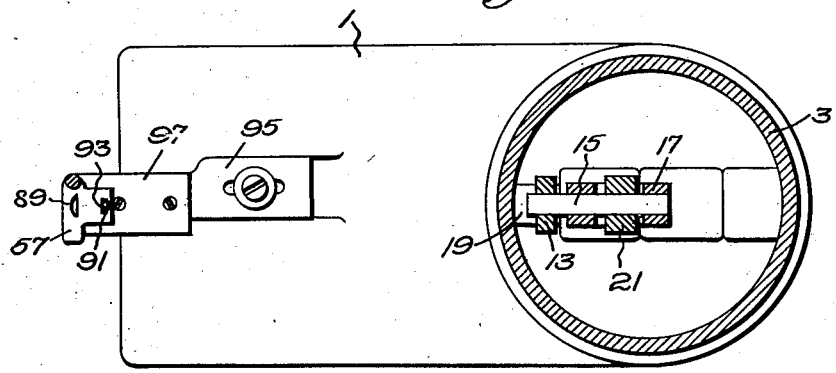
Inventor:
Frank W. Merrick
by Emery Booth Varney & Townsend
Attys.

April 27, 1937.  F. W. MERRICK  2,078,336
MACHINE FOR CUTTING SHEET MATERIAL
Filed Oct. 19, 1933    4 Sheets-Sheet 2
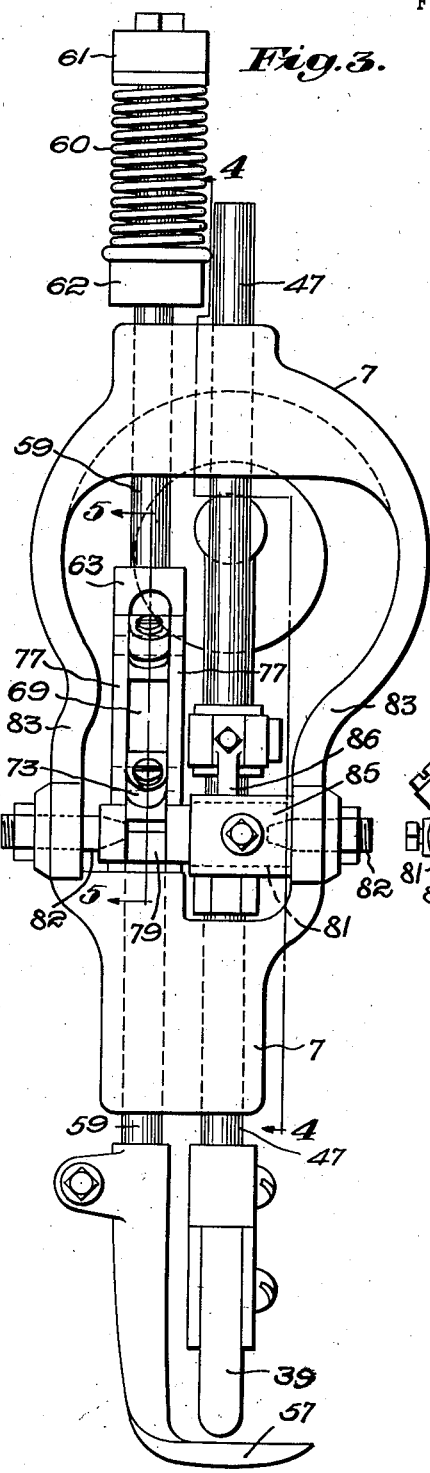
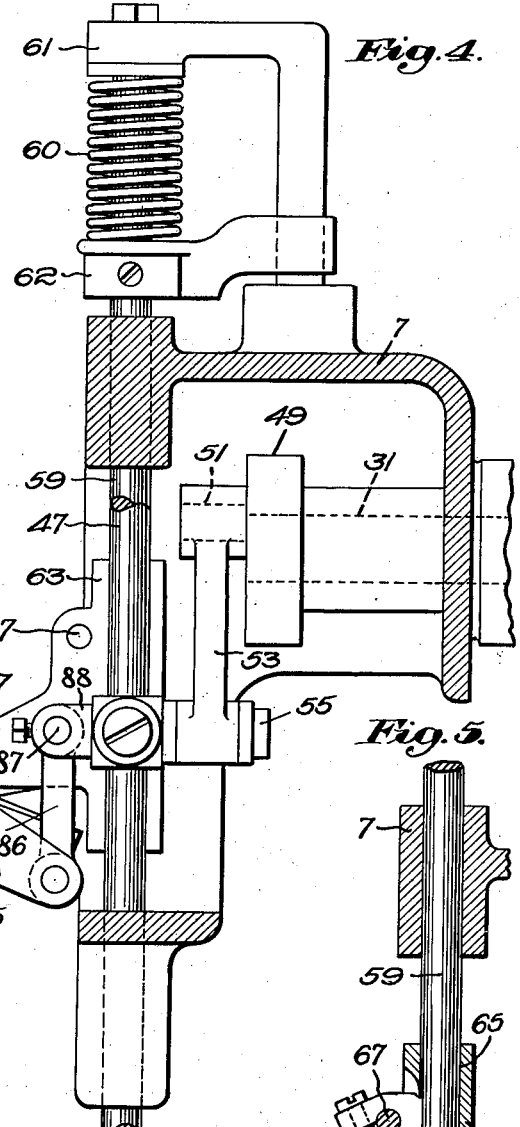
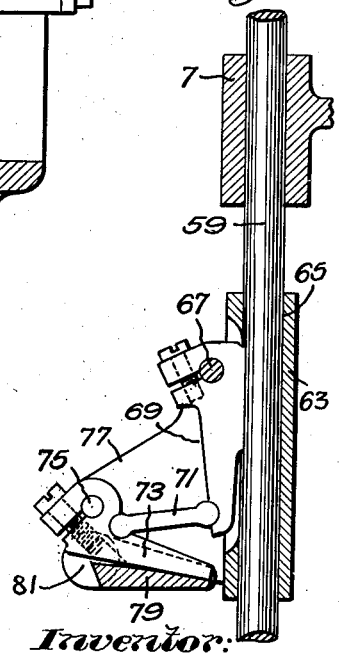
Inventor:
Frank W. Merrick
by Emery, Booth, Varney & Townsend
Attys

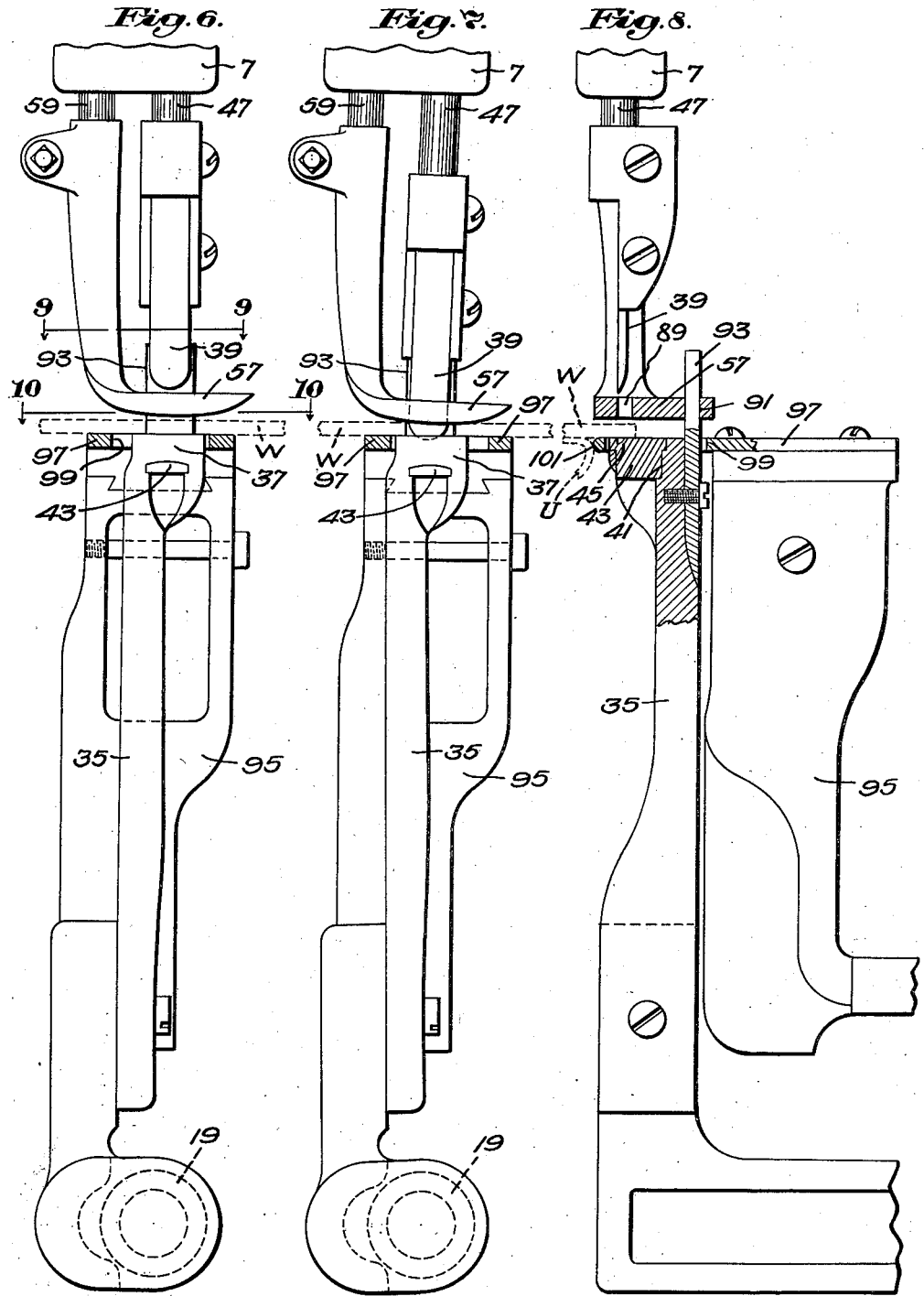

April 27, 1937.  F. W. MERRICK  2,078,336
MACHINE FOR CUTTING SHEET MATERIAL
Filed Oct. 19, 1933  4 Sheets-Sheet 4

Inventor:
Frank W. Merrick
by Emery Booth Varney + Townsend
Attys.

Patented Apr. 27, 1937

2,078,336

UNITED STATES PATENT OFFICE 2,078,336

MACHINE FOR CUTTING SHEET MATERIAL

Frank W. Merrick, Boston, Mass., assignor to United Shoe Machinery Corporation, Paterson, N. J., a corporation of New Jersey Application October 19, 1933, Serial No. 694,246

20 Claims. (Cl. 164—88)

My invention relates to machines for cutting sheet material, and particularly but not exclusively to one for trimming the edges of the shoe soles after attachment to the uppers.

The invention will be best understood from the following description when read in the light of the accompanying drawings of one machine constructed according to the invention, the scope of which latter will be more particularly pointed out in the appended claims.

In the drawings:—

Fig. 1 is a side elevation of the machine according to the invention, with parts broken away and parts in section;

Fig. 2 is a section on the line 2—2 of Fig. 1;

Fig. 3 is an end elevation, on an enlarged scale, of the head of the machine carrying the knife and presser foot;

Figure 9:
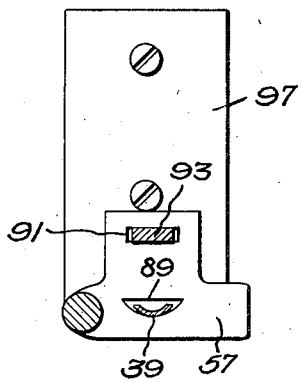
Figure 10:
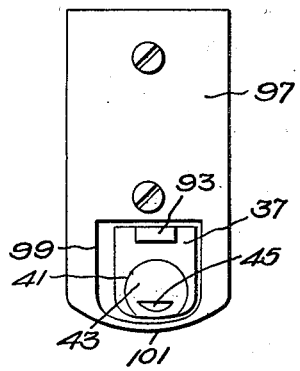
Figure 11:
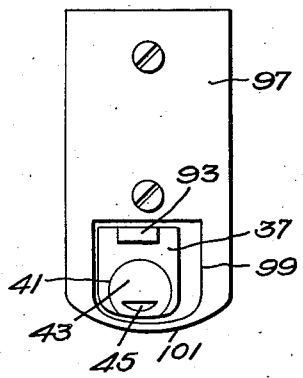
Figure 12:
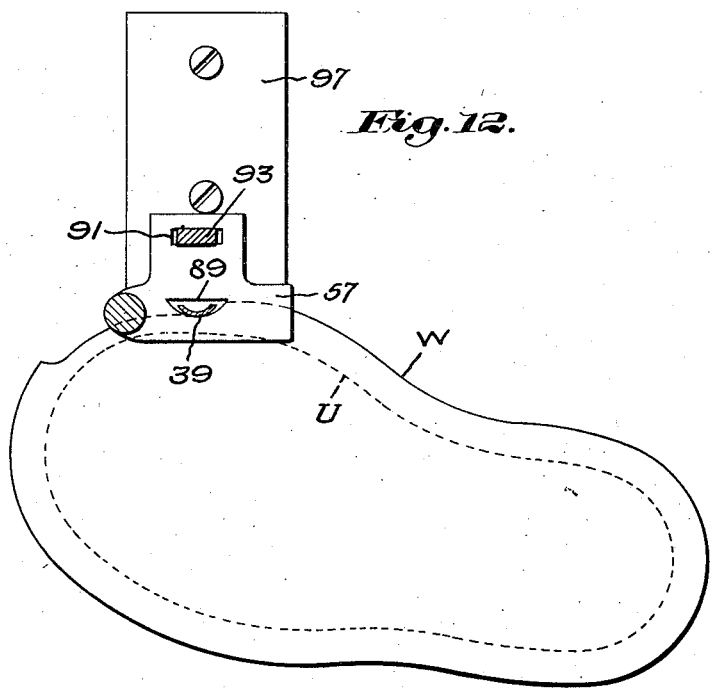

Figs. 4 and 5 are sections on the lines 4—4 and 5—5 of Fig. 3 respectively;

Figs. 6 and 7 are end views of the machine, on an enlarged scale, and with parts omitted, illustrating the different operative positions of the knife, presser foot, and platen;

Fig. 8 is a side elevation, with parts omitted and parts in section, of the mechanism shown by Figs. 6 and 7;

Figs. 9 and 10 are sections on the lines 9—9 and 10—10 of Fig. 6 respectively;

Fig. 11 is a section corresponding to Fig. 10 with the parts in a different operative position; and Fig. 12 is a section corresponding to Fig. 9 illustrating the operation of the device when trimming the edge of the sole of a shoe.

Referring to the drawings, I have shown a frame comprising the base portion 1, standard 3, and arm 5, the latter at the outer end thereof carrying a head 7. As illustrated, the head 7 is formed integrally with an oscillatory sleeve or spindle 9 mounted in the arm, so that the head may be oscillated relative to the arm for a purpose hereinafter described.

For oscillating the head 7, the spindle 9, as herein illustrated, is provided with a downwardly extending crank arm 11, fixedly secured thereto, the lower bifurcated end 13 of this arm engaging a pin 15 carried by an upwardly extending arm 17 fixed to an oscillatory shaft 19 mounted in the base of the machine. For oscillating the arm 17 and shaft 19, the pin 15 is engaged by the lower bifurcated end 21 of a lever 23 which is pivoted at 25 and has an upper bifurcated end 27 engaging with a cam 29 on the drive shaft 31 of the machine. Herein, the drive shaft is driven by a belt (not shown) which engages with the drive pulley 33. It will be observed that when the drive shaft 31 is rotated the cam 29 will cause oscillation of the lever 23 about its pivot 25. This will oscillate the lever 17 and the lever 11, and hence will oscillate the head 7 and the shaft 19.

As shown, the shaft 19 at the front end of the machine carries an upwardly extending arm 35, fixedly secured thereto, the upper end 37 of which arm serves as a platen for a knife 39. This portion 37 of the arm is provided with a bore 41 (Figs. 8 and 10) into which fits a plug 43 of brass or other relatively soft metal having a slight recess 45 on its upper surface, which recess the cutting edge at the lower end of the knife is adapted to enter. By this construction burring of the cutting edge of the knife is prevented.

The knife 39, which, for a purpose hereinafter described, conveniently is of arcuate cross-section, as shown in Figs. 9 and 12, is carried by a vertically reciprocating bar 47, which bar is mounted in suitable bearings in the oscillatory head 7. As shown, for reciprocating the knife bar 47, the forward end of the drive shaft 31 carries a crank disk 49 provided with a crank pin 51, which latter is connected by a link 53 to a pin 55 fixed to the bar, so that when the shaft 31 is rotated the bar will be longitudinally reciprocated in the head. As rotation of the shaft 31 also oscillates the head 7, as hereinbefore described, the knife will be given both a reciprocating and oscillatory movement.

As shown, the head 7 also carries a presser foot 57 for holding the work against the platen 37. This presser foot is carried by a vertically reciprocating bar 59 urged toward the platen by a helical compression spring 60, the latter acting between an abutment 61 fixed to the head 7 and an abutment 62 fixed to the bar.

As herein shown, for reciprocating the presser foot bar 59, the same is operatively connected to the reciprocating knife bar 47. As illustrated, slidably mounted on the presser foot bar is a member 63 having a bore 65 through which said bar slidably extends. Pivoted to the member 63 at 67 is a clamping member 69 which is operatively connected by a toggle strut 71 to a lever 73 pivoted to the member 63 at 75. As shown, the member 63 is formed integrally with a pair of arms 77 between which the levers 69 and 73 and strut 71 are positioned. The lever 73 has a wiping contact, as shown, with a finger 79 fixedly carried by a rock shaft 81, which latter is supported by the pintles 82 carried by the opposite side walls 83 of the head 7. As shown, the rock shaft 81 is provided with an arm 85 connected by a link 86 to a pin 87 on an arm 88 fixedly secured to the reciprocating knife bar 47. By this construction when the knife bar 47 moves upwardly the finger 79 is caused to wipe against the lever 73 and thus force the clamping member 69 against the bar 59 which locks the member 63 to said bar and causes upward movement of the presser bar. Upon downward movement of the knife bar 47 the clamping member 69 is released from the bar 59 and the latter descends due to the action of the helical compression spring 60. By reason of this construction the presser foot is given a constant lift relative to the work, and therefore automatically compensates for work of different thicknesses.

As shown, the presser foot 57 is so shaped (see Figs. 6 and 8) as to cause the work W, for example, the edge of the sole of a shoe, to be gripped between it and the platen 37. The presser foot is also shown as provided with a perforation 89 (Figs. 8 and 9) through which the knife 39 is adapted to extend. To prevent the presser foot from springing transversely and moving the perforation 89 out of registry with the knife, and for securing a smoother action of the parts, the presser foot is also provided with a slot 91 through which extends a bar or projection 93 rigidly carried by the arm 35. Preferably the slot 91 is of sufficient length to make a loose fit with the bar at the ends of the slot and is of proper width slidably to fit the opposite lateral sides of the bar.

Herein, the base 1 of the machine is provided with an upstanding work support member 95, the upper end of which carries a plate 97 projecting under the knife and presser foot. As shown, the plate is provided with a perforation 99 in which the platen 37 oscillates from the position shown by Fig. 10 to the position shown by Fig. 11. Conveniently, the forward edge 101 of the plate 97, as shown in Fig. 10, is curved to cause this edge to serve as a work guide.

In operation, assuming the knife 39 and presser foot 57 are in their raised positions, with the notch 45 of the platen 37 immediately below the cutting edge of the knife, as shown in Figs. 8 and 10, rotation of the drive shaft 31 will cause the knife to descend. Slight downward movement of the knife bar 47 from its extreme raised position causes the clamping member 69 to be released from the presser foot bar 59, allowing the presser foot to drop under the influence of the spring 60 and engage the work so as to clamp the latter between the presser foot and the upper face of the platen 37. Continued downward movement of the knife causes it to penetrate the work. As the knife descends, and penetrates the work, both the platen and the head 7, which latter carries the presser foot and knife, swing about their pivotal centers so as to move the parts into the position shown by Figs. 7 and 11. This latter movement acts to feed the work to the left as viewed in Figs. 6 and 7. Continued rotation of the shaft 31 then causes the knife to move upward. Upward movement of the knife bar causes the clamping member 69 to engage the presser bar 59, with the result that the presser bar is lifted to release the work. During the upward movement of the presser bar and knife, the head 7 and platen 37 oscillate in the opposite direction as before to move the parts again into the position shown by Figs. 6 and 10.

When an edge of a shoe sole is to be trimmed, the operator may hold the shoe and present it to the machine while it is in operation so as to place the edge of the sole on top of the platen and the adjacent edge of the upper against the work guard 101, as shown in Figs. 8 and 12. The rapid reciprocation and oscillation of parts heretofore described will feed the shoe to cause the knife rapidly to trim the edge of the sole.

It will be understood that wide deviations may be made from the form of the invention herein described without departing from the spirit thereof.

I claim:

1. In a machine for use of the character described, a part mounted for work feeding movement, a knife mounted thereon for cutting movement relative thereto, a platen for said knife mounted for work feeding movement, a presser foot cooperating with said platen mounted for work holding movement and work feeding movement, and means for moving said knife and presser foot for causing the former to penetrate the work and the latter to hold the work against said platen, and while said knife is in the work, moving said part, platen and presser foot in work feeding direction for feeding the work.

2. A machine for use of the character described having, in combination, a part mounted for reciprocatory movement, a knife mounted on said part for reciprocatory movement transverse to that of said part, a platen for said knife mounted for reciprocatory movement in the same direction as said part, means for coordinately reciprocating said part, knife and platen to force said knife into the work and move said part, knife and platen simultaneously to feed the work, and a presser foot for holding the work against said platen during the feeding stroke thereof.

3. A machine for use of the character described having, in combination, a part mounted for reciprocatory movement, a knife and a presser foot both mounted on said part for reciprocatory movement transverse to that of said part, a platen for said knife and presser foot mounted for reciprocatory movement in the same direction as said part, and means for coordinately operating said part, knife, platen and presser foot to cause the latter to press the work against said platen, and said knife to penetrate the work, and, while said knife is in the work, to cause simultaneous movement of said part and platen for feeding the work.

4. A machine for use of the character described having, in combination, a movable part, a knife movably mounted on said part, a platen for said knife, a presser foot cooperating with said platen, a work guide; and means for moving said knife and presser foot to cause the latter to hold the work against said platen and said knife to penetrate the work, and, while said knife is in the work, moving said part, platen and presser foot relative to said work guide for feeding the work.

5. A machine for use of the character described having, in combination, a reciprocatory part, a knife and a presser foot both mounted on said part for reciprocation transverse to that of said part, a platen mounted for reciprocation in the same direction as that of said part, a work guide; and means for coordinately reciprocating said part, knife, platen and presser foot to cause said presser foot to move to hold the work against said platen and said knife to move to penetrate the work, and, while said knife is in the work, to move said part and platen simultaneously to feed the work, and then simultaneously to move the instrumentalities through their return strokes to cause said presser foot to release the work and the knife to be withdrawn therefrom.

6. A machine for use of the character described having, in combination, a knife, a movably mounted platen for said knife, a presser foot for holding the work against said platen, a movable part upon which said knife and presser foot are operatively movably mounted, and means for moving said knife and presser foot relative to said part for causing said presser foot to hold the work against said platen and the knife to penetrate the work and for moving said part and platen simultaneously for feeding the work.

7. A machine for use of the character described having, in combination, a knife, a presser foot, an oscillatory head upon which said knife and presser foot are reciprocally mounted, a platen for said knife, and means for moving said presser foot and knife through one direction of reciprocation to cause said presser foot to hold the work against said platen and said knife to penetrate the work and simultaneously moving said head through one direction of oscillation for feeding the work.

8. A machine for use of the character described having, in combination, a knife, an oscillatory platen for said knife, a presser foot for said platen, an oscillatory head upon which said knife and presser foot are reciprocally mounted, and means for reciprocating said knife and presser foot and for simultaneously oscillating said head and platen in phase with each other.

9. A machine for use of the character described having, in combination, a reciprocatory knife, a platen member for said knife, and a presser foot member adjacent said knife for holding the work against said platen member, one of the members having a projection and the other member being provided with means for guiding said projection to hold the two members transversely in correct operating relation.

10. A machine for use of the character described having, in combination, a reciprocatory knife, a platen for said knife, a presser foot adjacent said knife for holding the work against said platen, means for moving said presser foot and platen relative to each other, and means forming an operative sliding connection between said platen and presser foot for holding the latter in operative relation to said knife.

11. In a rounding machine, a frame provided with an arm, a head mounted to oscillate upon the outer extremity of the frame arm, a knife bar arranged to reciprocate in the head, a driving shaft extending longitudinally of the frame arm, connections to the shaft for oscillating the head, and connections to the shaft for reciprocating the knife bar.

12. In a rounding machine, a frame provided with an arm, a sleeve rotatable in the frame arm, a head carried by the sleeve, a knife bar movable in the head, a driving shaft extending through the sleeve, means at the outer extremity of the shaft for communicating power to the knife bar, and means at the inner end of the shaft for communicating power to the sleeve and head.

13. In a rounding machine, a frame, a sleeve mounted to oscillate in the frame, a reciprocatory knife bar carried by the sleeve, a driving shaft journaled in the frame and extending through the sleeve, connections to the shaft for reciprocating the knife bar, and connections to the shaft for oscillating the sleeve.

14. In a rounding machine, a frame provided with an arm, a sleeve rotatable in the frame arm, a head carried by the sleeve, a knife bar movable in the head, a driving shaft extending through the sleeve, a lever fulcrumed upon the frame and oscillated by the driving shaft, and connections to the lever for turning the sleeve.

15. In a rounding machine, a frame provided with an arm, a head mounted to oscillate upon the outer extremity of the frame arm, a bar carrying a knife and arranged to reciprocate in the head, a driving shaft extending longitudinally of the frame arm, an oscillatory shaft journaled in the frame below the driving shaft, an arm extending upwardly from the oscillatory shaft and carrying a platen for cooperation with the knife, and connections to the driving shaft for oscillating the head, reciprocating the knife bar and oscillating the platen.

16. In a rounding machine, a frame provided with an arm, a sleeve mounted to oscillate in the frame arm, a head carried by the sleeve, a bar carrying a knife and arranged to reciprocate in the head, a driving shaft extending through the sleeve, an oscillatory shaft journaled in the frame below the driving shaft, a member extending upwardly from the oscillatory shaft and carrying a platen for cooperation with the knife, arms secured to the sleeve and oscillatory shaft, a lever fulcrumed upon the frame and oscillated by the driving shaft, actuating connections between the lever and the sleeve arm and the shaft arm, and connections between the driving shaft and bar for reciprocating said bar.

17. In a rounding machine, a reciprocatory knife bar, a movable presser foot bar, means for reciprocating the knife bar, a clamp arranged to engage the presser foot bar, and connections to the knife bar to actuate the clamp and move the presser foot bar.

18. In a rounding machine, a reciprocatory knife bar, a movable presser foot bar, means for reciprocating the knife bar, a clamp arranged to engage the presser foot bar, two levers movable in contact with each other, connections to the knife bar for moving one lever, and connections to the other lever for actuating the clamp.

19. In a rounding machine, a reciprocatory knife bar, a movable presser foot bar, means for reciprocating the knife bar, opposite clamping members arranged to engage the knife bar, one of said members being movable upon the other, two levers contacting with each other, one fulcrumed upon a clamping member and the other at a relatively fixed point, a link joining the movable clamping member to the lever fulcrumed on a clamping member, and connections to the knife bar for oscillating the lever having a relatively fixed fulcrum.

20. In a sole rounding machine, a table provided with an opening adjacent to which is a surface arranged to support the edge of a sole being operated upon, the table having a portion adapted to receive contact of the shoe upper to serve as a gage, a platen oscillating in the opening and transversely thereof, and an oscillatory knife cooperating with the platen.

FRANK W. MERRICK.